United States Patent
Swan et al.

(10) Patent No.: US 7,606,529 B1
(45) Date of Patent: Oct. 20, 2009

(54) WIRELESS-SIGNAL DISTRIBUTION SYSTEM VIA SET-TOP BOX

(75) Inventors: Timothy L. Swan, Lee's Summit, MO (US); Leonard E. Barlik, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 578 days.

(21) Appl. No.: 11/302,663

(22) Filed: Dec. 14, 2005

(51) Int. Cl.
*H04H 40/00* (2008.01)
(52) U.S. Cl. ........................................ 455/3.06; 725/81
(58) Field of Classification Search ................ 455/3.01, 455/3.04, 3.06; 725/80, 98, 100, 81
See application file for complete search history.

(56) References Cited

U.S. PATENT DOCUMENTS

| | | | |
|---|---|---|---|
| 5,381,459 A | 1/1995 | Lappington | |
| 5,953,670 A | 9/1999 | Newson | |
| 2003/0066082 A1* | 4/2003 | Kliger et al. | 725/80 |
| 2006/0098627 A1* | 5/2006 | Karaoguz et al. | 370/352 |
| 2007/0107019 A1* | 5/2007 | Romano et al. | 725/80 |

* cited by examiner

*Primary Examiner*—Tu X Nguyen

(57) ABSTRACT

Methods and systems are provided for facilitating wireless communications over a coaxial network coupled to a wireless communications network. The system comprises one or more set-top boxes capable of facilitating bi-directional wireless communications, one or more converting devices capable of converting between optical signaling and electrical signaling, and a base transceiver station coupled to one or more communications networks. One method comprises providing a set-top box capable of facilitating bi-directional wireless communications and providing for the communication of data through an out-of-band frequency channel. Another method comprises providing a set-top box physically coupled to a coaxial network and wireless network by a communications line having an out-of-band frequency channel, receiving a request to establish communications, and logically coupling two endpoints.

14 Claims, 6 Drawing Sheets

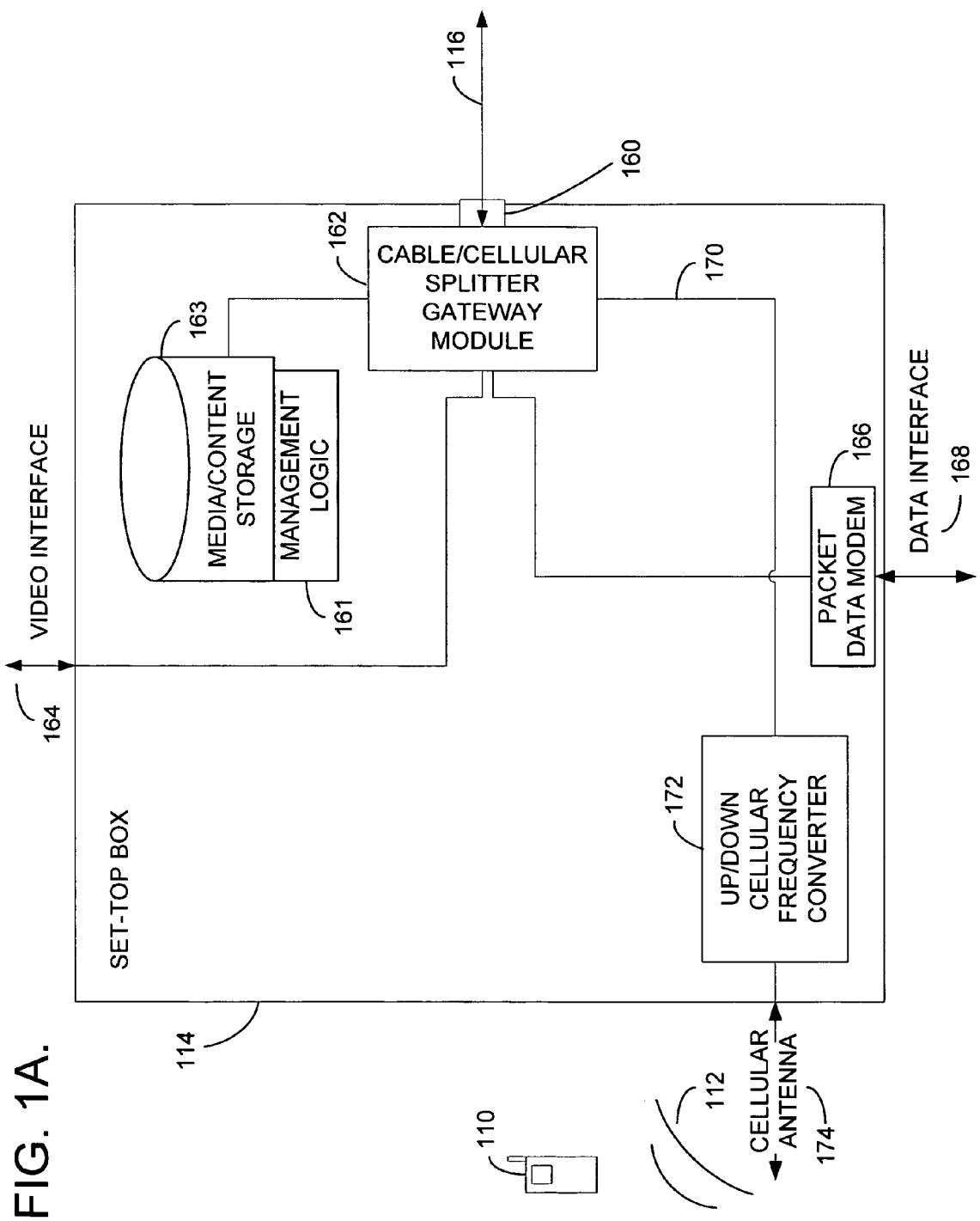

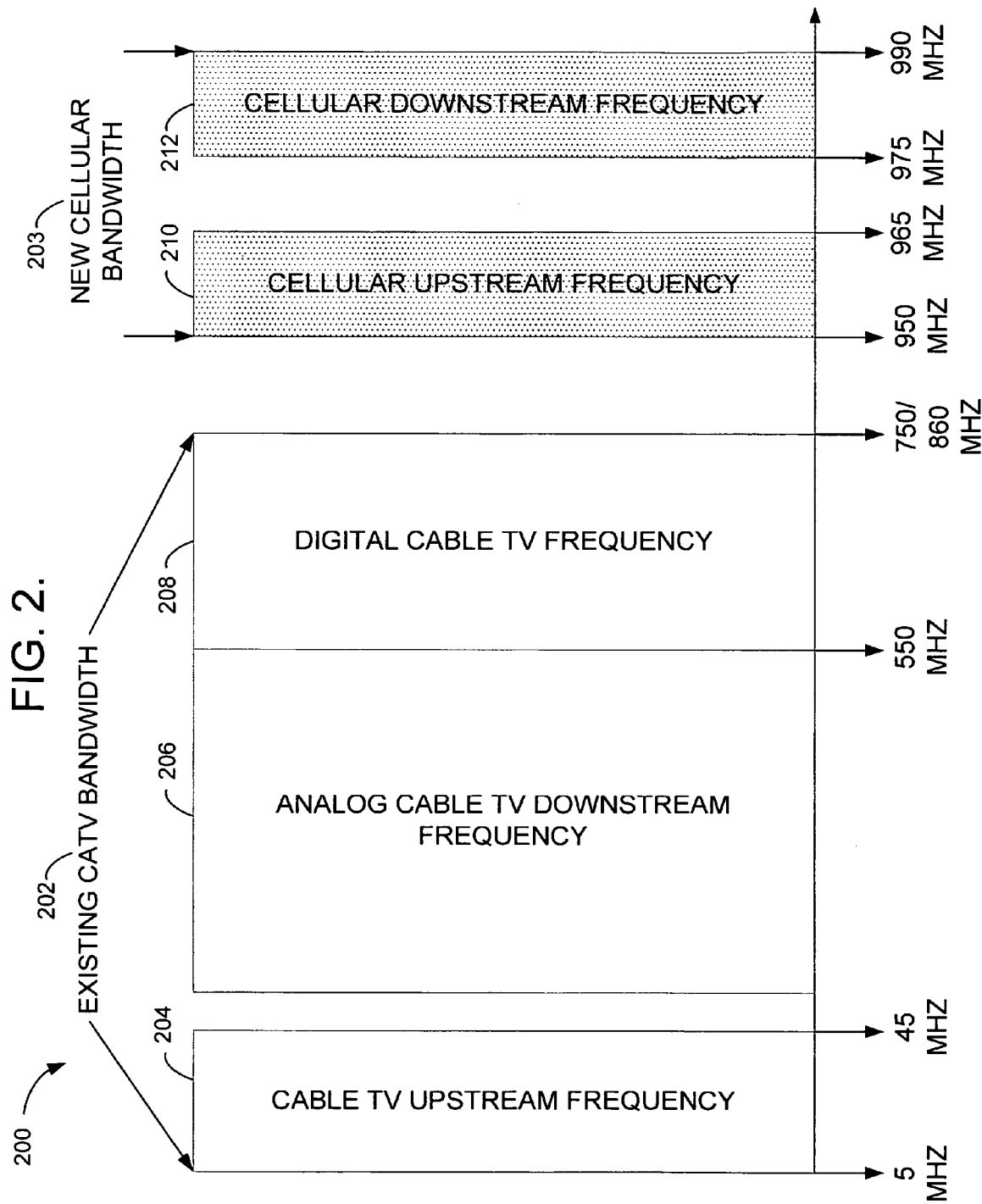

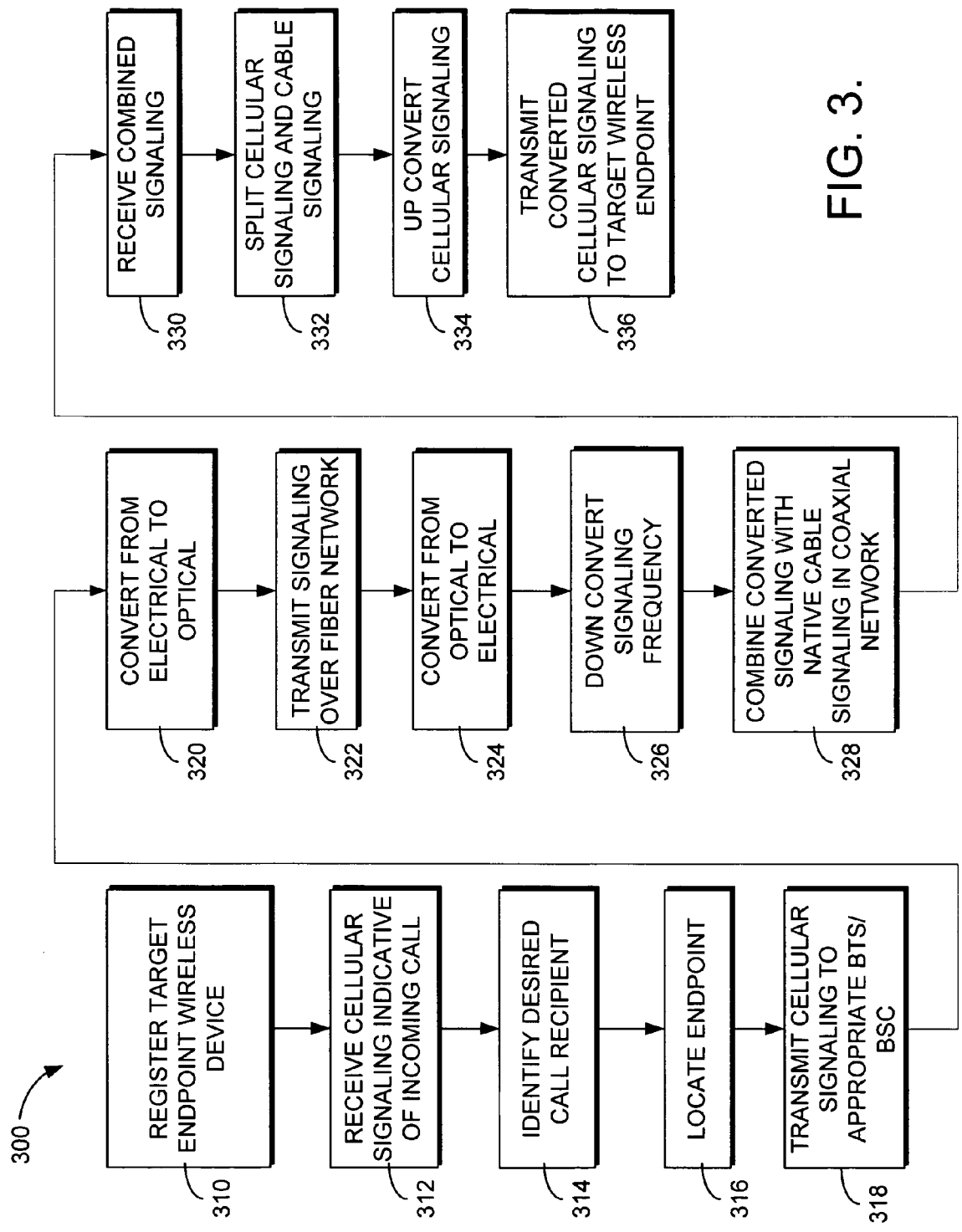

WIRELESS-SIGNAL DISTRIBUTION SYSTEM VIA SET-TOP BOX

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The use of mobile wireless communications technology has become increasingly important in modern society. Many individuals now use mobile phones, often referred to as "cellular phones" (but including phones that operate on digital networks such as PCS networks), as their primary in-home voice-communications devices. Today, it is common for individuals to use these phones in place of traditional land-line telephones. Mobile phones have also become an essential means of communication for businesses. There is a demand and desire to be able to use mobile phones inside office buildings and have them perform as well as when they are used outside.

A problem currently faced by wireless users inside buildings is that wireless signals often have poor penetration of external and internal walls. Users often experience little, intermittent, or even no reception inside large structures, resulting in the inability to originate outgoing or receive incoming calls. Additionally, users who enter large structures while in the middle of existing calls will often have their calls dropped as a result of diminishing signal strength. Today, additional services besides just voice communications are often desired to be provided by cellular wireless service providers; for example, short messaging or text messaging, wireless web connectivity, image transfer, and other services are being provided by wireless providers. The same issues that inhibit voice communications within large buildings also inhibit the use of these other services offered by wireless providers. A method for facilitating high-quality wireless communications inside buildings (or other dense structures) is needed.

Offices, homes, and other buildings often have existing cable-infrastructure components that, according to embodiments of the present invention, could be used to transport cellular signaling into these structures, effectively penetrating the walls of these structures. A way is needed to facilitate transmission of cellular communications signaling via these existing coaxial networks. A potential problem associated with using existing cable infrastructure is that existing cable bandwidth is reaching capacity. Delivery of traditional cable services, digital cable services, high-definition services, and data services such as high-speed Internet and voice-over-IP services, is currently consuming large quantities of the typical below-860 MHz cable frequencies. The current state of the art could be improved by providing a way to facilitate transmission of wireless communications signaling via existing coaxial networks which have little extra bandwidth in the below-860 MHz range.

SUMMARY

Embodiments of the present invention solve at least the above problems by providing a system and method for, among other things, facilitating indoor wireless communications between endpoint devices via existing coaxial networks and cellular-wireless provider networks. The present invention has several practical applications in the technical arts including increasing indoor wireless signaling coverage.

In an embodiment of the present invention, a system for facilitating wireless communications via a set-top box coupled to a cable-services-provider network and a wireless-services-provider network is provided. In this embodiment, cellular signaling is delivered to the customer premises via a network (such as a fiber network), converted to an electrical signaling format, and communicated over the coaxial network along with legacy cable services, thereby facilitating indoor wireless coverage. The cellular signaling is carried through the coaxial network, not allowing it to leak, within a portion of spectrum that is out-of-band from the current cable-services signaling.

In another embodiment, a method for originating a voice call at a wireless endpoint near a set-top box is provided. An in-building coaxial network containing an out-of-band frequency channel is used to transport cellular signaling to a fiber network and subsequently to a wireless provider network. In this embodiment, the call has a destination of a wireless device on the macro-cellular network.

In a final illustrative embodiment, a method is provided for originating a voice call at a wireless endpoint out on the macro-cellular network with a destination of a wireless endpoint near a set-top box. In these embodiments, calls may also originate on a communications network (such as the public switched telephone network or a variation thereof) or have destinations of users on the public switched telephone network.

BRIEF DESCRIPTION OF THE SEVERAL VIEWS OF THE DRAWINGS

The present invention is described in detail below with reference to the attached drawing figures, which are incorporated by reference herein and wherein:

FIG. 1A is a block diagram depicting an illustrative set-top box in greater detail;

FIG. 2 is an illustrative chart displaying existing cable bandwidth usage and new cellular bandwidth usage in accordance with an embodiment of the invention;

FIG. 3 is a process diagram illustrating an exemplary method for practicing an embodiment of the present invention.

DETAILED DESCRIPTION

Figure 1:
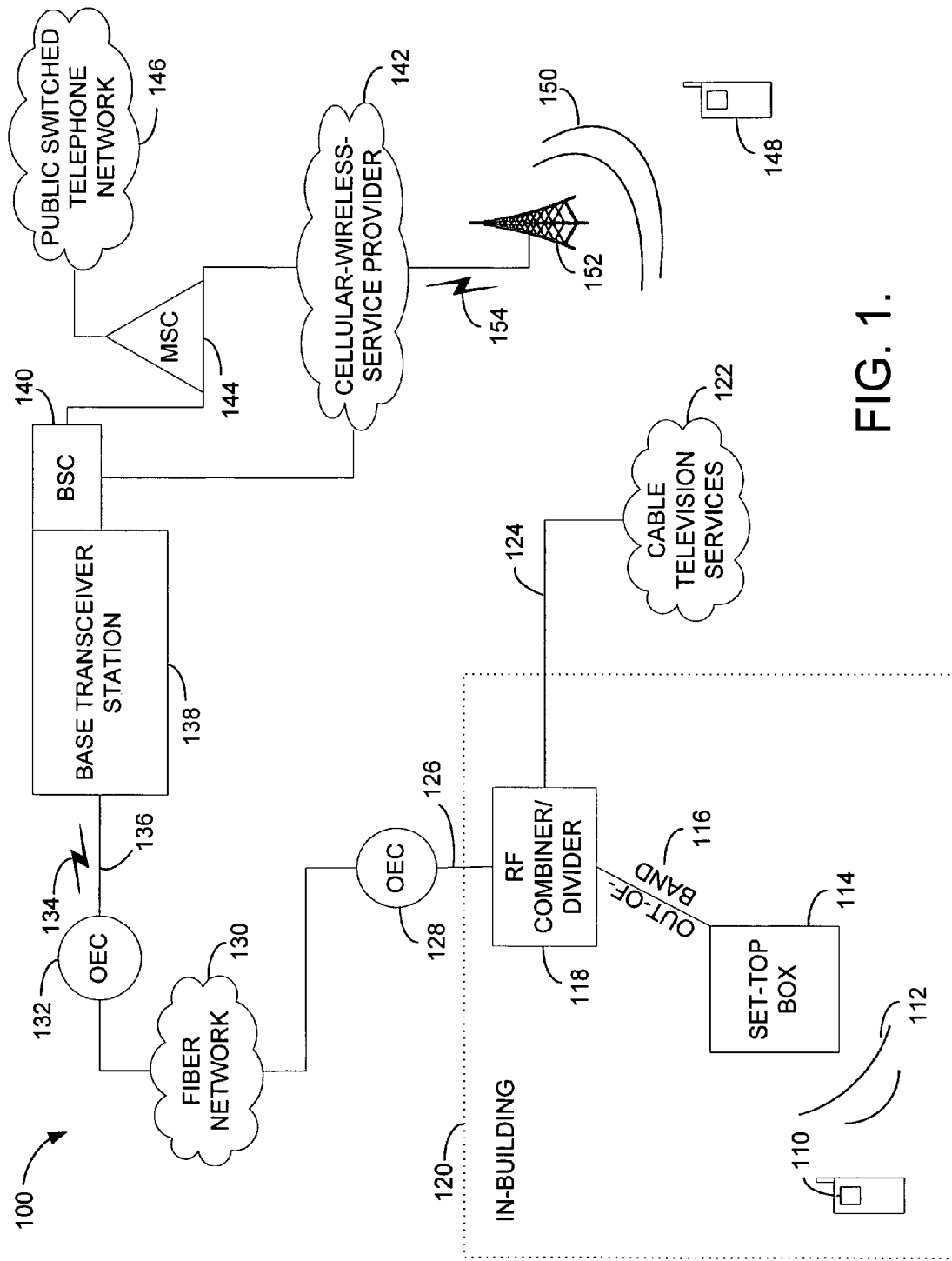
FIG. 1 is a block diagram of a wireless communications system in accordance with an embodiment of the invention.

In one embodiment, the present invention facilitates wireless communications via a coaxial communications network coupled to a wireless communications network. Embodiments also enhance indoor wireless coverage using a set-top box coupled to a coaxial network by a communications line having an out-of-band frequency channel allocated within it.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| BSC | Base Station Controller |
| BTS | Base Transceiver Station |
| CATV | Cable Television |
| HLR | Home Location Register |
| MSC | Mobile Switching Center |
| OEC | Optical-Electrical Converter |
| RF | Radio Frequency |
| STB | Set-Top Box |

Further, various technical terms are used throughout this description. A definition of such terms can be found in Newton's Telecom Dictionary by H. Newton, 21$^{st}$ Edition (2005). These definitions are intended to provide a clearer understanding of the ideas disclosed herein but are not intended to limit the scope of the present invention.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Turning now to FIG. 1, an exemplary operating environment for practicing the present invention is depicted and referenced generally by the numeral 100. A mobile wireless device 110 is in communication with a set-top box 114. Mobile wireless device 110 may be, for example, a cellular phone, PCS phone, personal data assistant (such as a BLACKBERRY-type device offered by Research In Motion Limited of Waterloo, Ontario) or other mobile wireless communications device. Set-top box 114 could be a cable television set-top box, a cable ready television, a digital cable set-top box, or any device that enables a cable television subscriber to view content currently provided by a media content service provider such as a cable television service provider. Exemplary embodiments of set-top box 114 will be described in further detail below. In addition to providing traditional cable television services, set-top box 114 also provides wireless communications services by being coupled to a wireless communications network 142.

Set-top box 114 is coupled to RF combiner/divider 118 via an out-of-band channel in communications link 116. Communications link 116 can be any in-building wired network such as a coaxial network that currently delivers cable television and/or other data services. Communications link 116 contains an out-of-band spectrum range or frequency channel within the range of about 860 MHz to 1 GHz. Communications link 116 carries cellular signaling within this out-of-band frequency channel, thereby not consuming any bandwidth associated with services in the range below 860 MHz. Communications link 116 is located within a building 120 in a preferred embodiment. Building 120 can be a home, office, or any structure (including natural structures). RF combiner/divider 118 can be any device capable of both combining and dividing RF signaling such as cable TV signaling, data-services signaling, and cellular signaling.

In this embodiment, RF combiner/divider 118, in one direction, combines signaling from communications line 126 and communications line 124. In another direction, RF combiner/divider 118 divides signaling from communications link 116 into signaling bound for line 126 and line 124. Communications line 124 couples RF combiner/divider 118 to a cable television services network 122. Cable television services network 122 can be any cable-services-provider network that provides television and other data services to a home, office, or other location. RF combiner/divider 118 is coupled to an optical-electrical converter 128 via a communications line 126. Optical-electrical converter 128 is capable of both converting electrical signaling to optical signaling and converting optical signaling to electrical signaling. Optical-electrical converter 128 is also capable of up and down converting the frequency of electrical signaling.

Optical-electrical converter 128 is coupled to a fiber network 130. Fiber network 130 can be any fiber-optic network such as, for example, a fiber network provided by a local exchange carrier (LEC). Fiber network 130 is coupled to an optical-electrical converter 132, which is capable of converting between optical signaling and electrical signaling.

Optical-electrical converter 132 is coupled to a base transceiver station 138 via a communications link 136. Communications link 136 carries electrical signaling 134 between optical-electrical converter 132 and base transceiver station 138. Base transceiver station 138 may service a network of set-top boxes in one or a plurality of buildings. Base transceiver station 138 is coupled to and controlled by a base station controller 140. Base station controller 140 performs functions such as controlling power to base transceiver station 138 as well as converting between 8 Kb mobile signaling and conventional 24 Kb voice signaling. Together, base transceiver station 138 and base station controller 140 are provisioned on a cellular wireless service provider network 142. Base transceiver station 138 and base station controller 140 operate as any BTS and BSC currently do in a cellular-wireless-service provider network 142.

Base station controller 140 and cellular-wireless-service provider network 142 are coupled to a mobile switching center 144. Mobile switching center 144 provides an interface between the macro-cellular network and the public switched telephone network 146. A cellular wireless provider 142 can contain many base transceiver stations such as base transceiver station 152, which communicates with wireless endpoint devices such as a wireless endpoint 148. Wireless endpoint 148 and base transceiver station 152 communicate via an air interface using RF signaling 150. Base transceiver station 152 sends and receives signaling 154 to serve as an intermediary between mobile device 148 and cellular-wireless-service provider 142.

Turning now to FIG. 1A, a more detailed view of set-top box 114 is provided. Set-top box 114 includes a variety of subcomponents not shown so as to not obscure the present invention. The depiction of set-top box 114 in FIG. 1A is provided for illustrative purposes and is not intended to limit the scope of possible set-top boxes. In one embodiment, set-top box 114 includes a connection 160 to communications link 116, which contains an out-of-band frequency channel. In this embodiment, set-top box 114 also contains a cable/cellular splitter gateway 162, which is capable of separating incoming cable and cellular signaling, as well as combining outgoing cable and cellular signaling. The cable signaling may include video signaling that is transmitted over a video interface 164. Video interface 164 may, for example, be connected to any visual output device, such as a television. In addition to being connected to video interface 164, cable/cellular splitter gateway 162 is coupled to a packet data modem 166, which facilitates delivery of data services via a data interface 168, which may be coupled to a device such as a personal computer.

After being separated at cable/cellular splitter gateway 162, cellular signaling is transmitted via connection 170 to an up/down cellular frequency converter 172. Frequency converter 172 is capable of both increasing the frequency of signaling and decreasing the frequency of signaling. Frequency converter 172 is also coupled to a cellular antenna 174, which is capable of transmitting cellular signaling via RF waves 112 in an air interface. RF waves 112 are received by wireless endpoint 110. Set-top box 114 can also include a media and content storage component 163 as well as a management logic component 161.

Figure 1B:
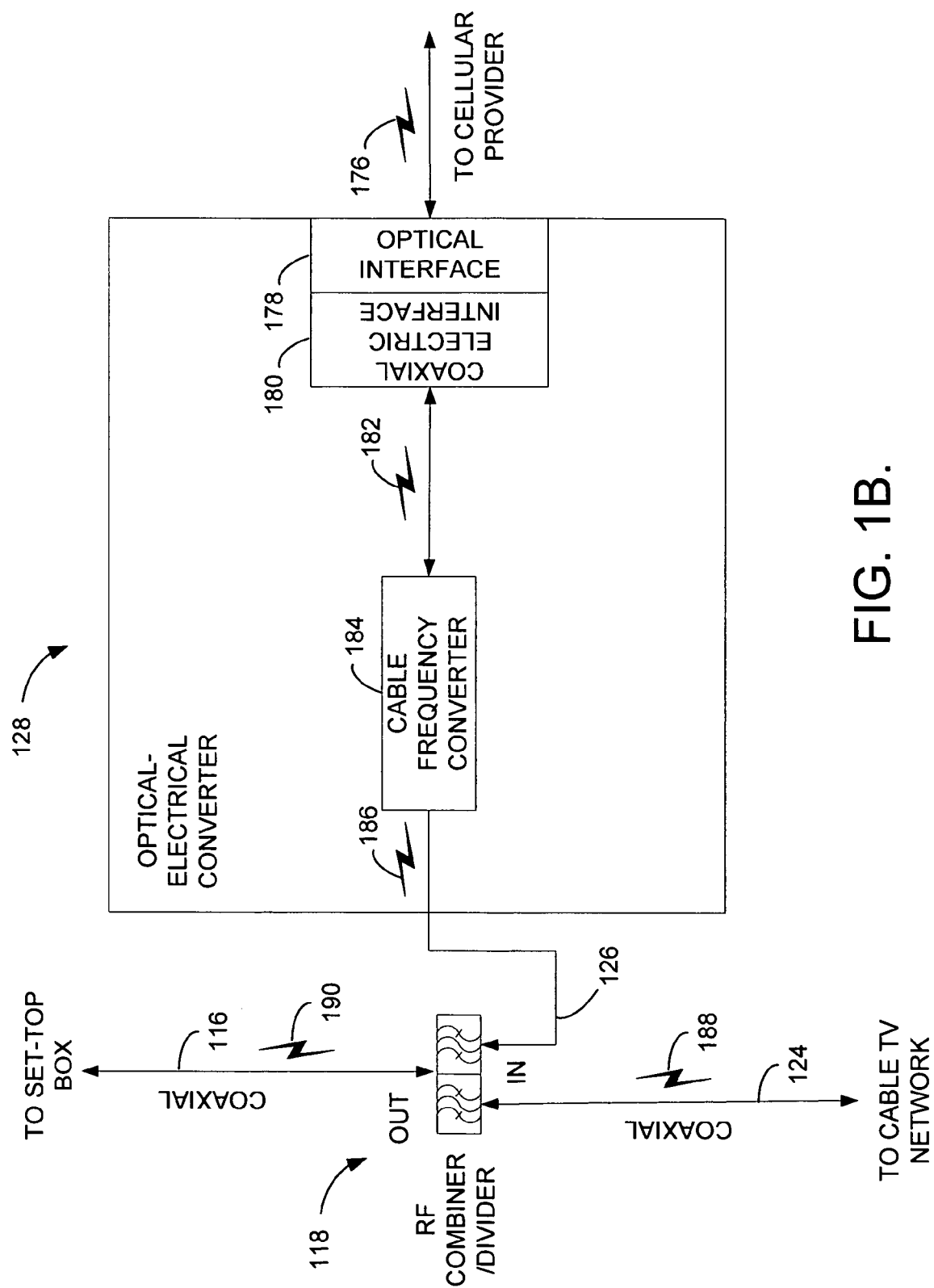
FIG. 1B is a block diagram of an illustrative optical-electrical converter in accordance with an embodiment of the invention.

Turning now to FIG. 1B, a more detailed illustration of optical-electrical converter 128 and RF combiner/divider 118 is shown. Optical cellular signaling 176 is received at an optical interface 178 and subsequently converted at a coaxial electric interface 180 into electrical signaling. Likewise, electrical cellular signaling 182 is received in the opposite direction at coaxial electric interface 180 and converted at optical interface 178 into optical cellular signaling 176. Optical-electrical converter 128 also contains a cable frequency converter 184, which is capable of increasing and decreasing the frequency of the electrical cellular signaling. The conversion between optical signaling and electrical signaling is a process known in the art. Optical-electrical converter 128 can include a variety of components including other components not shown. Optical-electrical converter 128 is coupled to RF combiner/divider 118 via a connection 126.

Outgoing cellular signaling 186 is combined with incoming cable signaling 188, which is being carried on coaxial connection 124. RF combiner/divider 118 outputs combined cable and cellular signaling 190 via the communications link 116, which is coupled to set-top box 114.

Turning now to FIG. 2, an illustration of the signaling bandwidth spectrum 200 that is carried in communications link 116 is shown. Bandwidth spectrum 200 includes the existing cable television bandwidth 202 as well as newly allocated cellular bandwidth 203. The existing cable television bandwidth includes, by way of example and not limitation, upstream cable television frequency 204, downstream analog cable frequency 206, and digital cable television frequency 208. Typically, existing cable television bandwidth 202 exists in a bandwidth range below 860 MHz, as depicted in FIG. 2. But bandwidth in the range above 860 MHz and below 1 GHz is available. This bandwidth capacity is used for new cellular bandwidth 203, which can carry cellular signaling to and from set-top box 114. This new cellular bandwidth 203 forms an out-of-band frequency channel, which contains an upstream cellular bandwidth 210 and a downstream cellular bandwidth 212. The particular frequencies displayed in FIG. 2 are merely illustrative and should not be construed as limiting.

Turning now to FIG. 3, an exemplary process for facilitating wireless communications via a coaxial network coupled to a wireless communications network is depicted and referenced generally by the numeral 300. In the process 300, an exemplary embodiment of the invention, a scenario is depicted wherein a wireless user on the macro-cellular network is placing a call from a wireless endpoint 148 to a target wireless endpoint 110 near a set-top box 114 inside of a building 120. For example, an individual in her car could be placing a phone call using her PCS to an individual at work inside his office in comparatively close proximity to a cable television set.

At a step 310, wireless endpoint 110 is registered with applicable base transceiver station 138 and its location and assigned BTS/BSC are stored in a home location register (HLR) within a cellular-wireless-service provider network 142. An HLR typically stores data on the current location of any given wireless. Typically, a mobile endpoint is associated with the nearest base transceiver station or to the base transceiver station emitting the strongest signal relative to the endpoint. In this case, the HLR would assign mobile endpoint 110 to base transceiver station 138. Mobile endpoint 110 would communicate via set-top box 114 with base transceiver station 138 and the cellular network 142 would determine that station 138 is the station best-suited to facilitate wireless communications for endpoint 110, which is located inside building 120.

At a step 312, base transceiver station 152 out on the macro cellular network receives signaling from wireless endpoint 148 indicative of an incoming call. This signaling will indicate to the cellular-wireless-service provider 142 the identity of a desired call recipient. At a step 314, the desired call recipient is identified. A home agent in a cellular network performs the function of receiving incoming data calls and routing those calls to the desired endpoint. Regardless of where the mobile endpoint may be located on the macro-cellular network, the home agent will locate the mobile endpoint. At a step 316, the appropriate base transceiver station 138 is located using the stored location of endpoint 110 in the HLR. In this case, endpoint 110 has been assigned to base transceiver station 138. At a step 318, the cellular signaling is transmitted to the appropriate base transceiver station 138.

The electrical cellular signaling 134 is converted at a step 320 in the optical-electrical converter 132. At a step 322, the now optical cellular signaling is transmitted over a fiber network 130. Once near the desired destination, at a step 324, the optical cellular signaling is converted to electrical cellular signaling within optical-electrical converter 128. At a step 326, the frequency of the now electrical cellular signaling is down-converted from approximately 1,900 MHz to a frequency approximately within the range of between 975 MHz and 990 MHz, which corresponds to the cellular downstream bandwidth 212. This down conversion process is done to facilitate transmission of the signaling within a coaxial network. At a step 328, the down-converted cellular signaling is combined at the RF combiner/divider 118 with the native cable signaling which is inbound from the cable television services provider 122. The output bandwidth of the RF combiner/divider was described above in FIG. 2. The out-of-band signaling is transported along with the existing cable signaling via the communications link 116. And, at a step 330, the combined cable and cellular signaling are received by set-top box 114 at connection 160.

At a step 332, the combined signaling is split by the cable/cellular splitter gateway 162. The cable signaling is transmitted to video interface 164 and data interface 168. The cellular signaling is transmitted via connection 170 to the cellular frequency converter 172. At a step 334, the cellular signaling is up converted to a frequency of about 1,900 MHz. At a step 336, the converted cellular signaling is transmitted via the cellular antenna 174. Cellular signaling is transmitted in the air interface via RF waves 112 to the mobile endpoint 110. This description of exemplary process 300 only describes the downstream communication from mobile endpoint 148 on the macro cellular network to mobile endpoint 110 near set-top box 114. In reality, downstream and upstream communications are both occurring. Upstream communications occur in the same manner using a reverse process.

Figure 4:
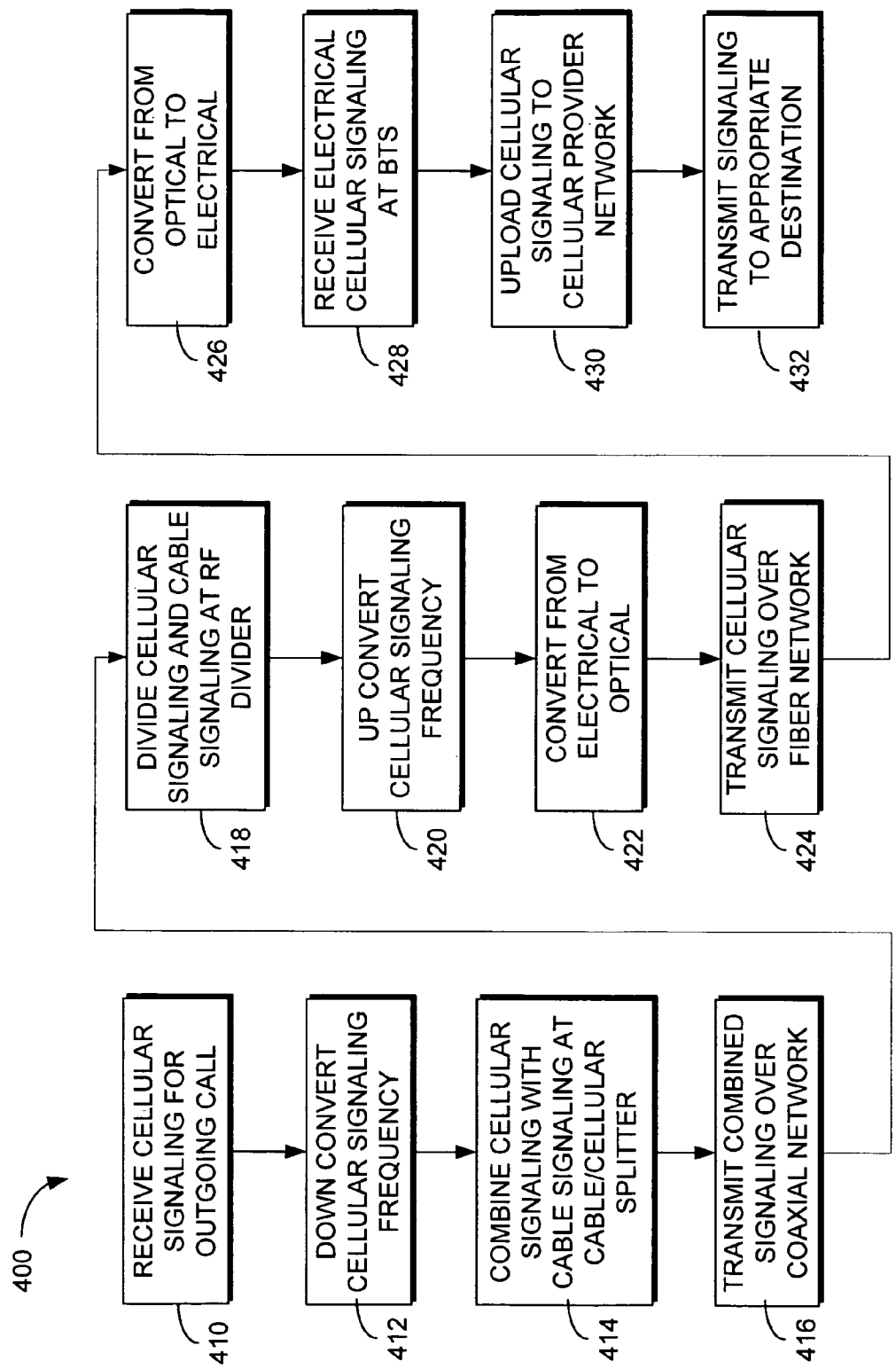
FIG. 4 is a process diagram illustrating an exemplary method for practicing another embodiment of the invention.

In FIG. 4, an exemplary process 400 is described that provides for the upstream communication from mobile endpoint 110 near set-top box 114 to mobile endpoint 148 out on the macro-cellular network. In this case, upstream communication is described as a call originating at mobile endpoint 110 with a destination of mobile endpoint 148. At a step 410, set-top box 114 receives cellular signaling from mobile endpoint 110 via cellular antenna 174. At a step 412, the cellular signaling is down converted from a frequency of about 1,900 MHz to a frequency of approximately within 950 MHz and 965 MHz by the up-down cellular frequency converter 172. This frequency approximately within 950 MHz and 965 MHz corresponds to the cellular upstream bandwidth 210. At a step 414, the cellular signaling is combined at the cable/cellular splitter gateway 162 with the cable signaling. Once combined, the cable signaling and cellular signaling are out-of-band. The bandwidth spectrum 200 was described above in connection with FIG. 2. At a step 416, the combined signaling is transmitted from set-top box 114 over the in-building coaxial network via communications link 116.

Before exiting the building 120, the cellular signaling is separated from the cable signaling, at a step 418, in the RF combiner/divider 118. The cellular signaling exits the building over the line 126 and enters the optical-electrical converter 128. At a step 420, the frequency of the cellular signaling is up converted at cable frequency converter 184 to a frequency of approximately 1,900 MHz. The converted cellular signaling then enters the coaxial electric interface 180, where at a step 422, it is converted from electrical signaling to optical signaling. At a step 424, the cellular signaling exits the optical interface 178 and is transmitted over fiber network 130. The cellular signaling is received at the optical-electrical converter 132 and, at a step 426, is converted from optical signaling to electrical signaling. Electrical signaling 134 is transmitted over a communications link 136 to base transceiver station 138 at a step 428. At a step 430, the base transceiver station 138 uploads the cellular signaling via base station controller 140 to the cellular wireless service provider network 142.

At a step 432, the cellular signaling is transmitted to the appropriate destination from the cellular-wireless-service provider network 142. In this case, the destination could be a mobile endpoint 148. In the alternative, the cellular signaling could be transmitted to a public switched telephone network 146 via a mobile switching center 144. In another embodiment, a call could originate on a public switched telephone network 146 and proceed downstream to mobile endpoint 110 in a fashion similar to exemplary process 300 described above. Although these processes and exemplary processes 300 and 400 have been described as one-way processes, in reality the upstream and downstream processes are occurring simultaneously as voice data and metadata are transmitted between the mobile endpoints 110 and 148 or between the mobile endpoint 110 and a user on the public switched telephone network.

One advantage of the present invention over the prior art is its usage of an out-of-band frequency channel within the coaxial network. Usage of out-of-band frequencies would not require any substantial changes in the configuration of the existing legacy cable network. Additionally, building penetration is achieved using existing coaxial infrastructures.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for facilitating wireless communications, the method comprising:
   providing at least one set-top box that is capable of facilitating bi-directional wireless communications with one or more endpoints, wherein the set-top box includes an up-down frequency converter coupled to a cellular antenna, and a splitter module capable of separating or combining cable signaling from cellular signaling;
   providing for the communication of a first set of data through a cable out-of-band (OOB) frequency channel in a coaxial communications network to the set-top box, wherein the data can be received by the one or more endpoints;
   down converting, by the up-down frequency converter, a frequency of cellular signaling included in the first set of data for communication in the OOB frequency channel in the coaxial communication network;
   providing for the communication of a second set of data from the set-top box through the OOB frequency channel; and
   up converting, by the up-down frequency converter, a frequency of cellular signaling included in the second set of data communicated in the OOB frequency channel in the coaxial communication network to communicate with at least one of the one or more endpoints over the air using the cellular antenna.

2. The method of claim 1 wherein the OOB frequency channel comprises upstream bandwidth and downstream bandwidth.

3. The method of claim 2 wherein the OOB frequency channel is within a bandwidth range of about 860 MHz to 1 GHz.

4. The method of claim 1 wherein the one or more endpoints are one or more wireless communications devices.

5. The method of claim 1 wherein the communication includes converting between electrical signaling and optical signaling and wherein the communication further includes converting the frequency of signaling to a different frequency.

6. One or more computer-readable media having computer-useable instructions embodied thereon for performing the methods of claim 1.

7. A method for facilitating wireless communications via an in-building coaxial communications network coupled to a wireless communications network, the method comprising:

providing a set-top box physically coupled to the coaxial network and the wireless network by a communications line, the communications line having an OOB frequency channel above 860 Mhz allocated within it;

receiving from a first endpoint a request to establish a communications link with a second endpoint, the receiving comprising: converting electrical signaling to optical signaling and converting the frequency of signaling to a different frequency; and using the OOB frequency channel, logically coupling the first endpoint to the second endpoint, wherein the OOB frequency channel comprises an upstream component and a downstream component.

8. The method of claim 7 wherein logically coupling includes identifying one or more appropriate base transceiver stations capable of facilitating the communications link.

9. The method of claim 7 wherein the first endpoint is a mobile wireless device.

10. The method of claim 7 wherein the second endpoint is a mobile wireless device.

11. One or more computer-readable media having computer-useable instructions embodied thereon for performing the method of claim 9.

12. A system for facilitating wireless communications via a coaxial network coupled to a wireless communications network, the system comprising:

one or more set-top boxes that are capable of facilitating bi-directional wireless communications, the one or more set-top boxes physically coupled to the coaxial network and the wireless communications network by a communications line having a cable out-of-band (OOB) frequency channel allocated within it;

one or more converting devices that are capable of converting optical signals to electrical signals and of converting electrical signals to optical signals;

one or more combining and dividing devices coupled to the set top box via the communication line and capable of combining and dividing cable and cellular electrical signaling; and a base transceiver station coupled to one or more communications networks via a base station controller.

13. The system of claim 12 wherein the one or more converting devices are further capable of converting the frequencies of the electrical signals to different frequencies.

14. The system of claim 12 wherein the one or more set-top boxes are physically coupled to the wireless communications network via a fiber optic network.

* * * * *

UNITED STATES PATENT AND TRADEMARK OFFICE
CERTIFICATE OF CORRECTION

PATENT NO. : 7,606,529 B1  Page 1 of 1
APPLICATION NO. : 11/302663
DATED : October 20, 2009
INVENTOR(S) : Swan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 888 days.

Signed and Sealed this

Twelfth Day of October, 2010

David J. Kappos
*Director of the United States Patent and Trademark Office*